United States Patent [19]

Walker et al.

[11] Patent Number: 4,881,245

[45] Date of Patent: Nov. 14, 1989

[54] IMPROVED SIGNALLING METHOD AND APPARATUS

[75] Inventors: Watson F. Walker, Pittsford; Jack L. Sutherland, Rochester, both of N.Y.

[73] Assignee: Harris Corporation, Rochester, N.Y.

[21] Appl. No.: 31,190

[22] Filed: Mar. 27, 1987

Related U.S. Application Data

[63] Continuation of Ser. No. 510,267, Jul. 1, 1983, abandoned.

[51] Int. Cl.$^4$ .............................................. H04B 7/02
[52] U.S. Cl. ........................................ 375/38; 370/74; 370/102; 375/40; 375/58; 455/59
[58] Field of Search ............... 455/59, 63, 65; 375/37, 375/38, 40, 48, 51, 57, 58; 370/69.1, 74, 100, 102

[56] References Cited

U.S. PATENT DOCUMENTS

| | | | |
|---|---|---|---|
| 2,151,454 | 3/1939 | Walter | 370/121 |
| 2,388,001 | 10/1945 | Loughren | 370/69.1 |
| 2,542,183 | 2/1951 | Edwards | 370/74 |
| 2,558,439 | 6/1951 | Hurault | 370/74 |
| 2,927,966 | 3/1960 | Weller | 370/76 |
| 3,290,440 | 12/1966 | Easton et al. | 370/98 |
| 3,404,229 | 10/1968 | Downey et al. | 455/63 |
| 3,444,320 | 5/1969 | Miyagi | 375/48 |
| 3,475,559 | 10/1969 | Ringlehaan | 370/105 |
| 3,517,131 | 6/1970 | Becker | 370/74 |
| 3,550,003 | 12/1970 | Halsted | 375/38 |
| 3,566,036 | 2/1971 | Roche et al. | 370/74 |
| 3,701,852 | 10/1972 | Sluijter | 375/38 |
| 3,810,019 | 5/1974 | Miller | 375/38 |
| 4,011,511 | 3/1977 | Chang | 375/48 |
| 4,035,628 | 7/1977 | Lampe et al. | 377/76 |
| 4,410,980 | 10/1983 | Takasaki et al. | 370/102 |
| 4,535,451 | 8/1985 | Drupsteen | 370/102 |

Primary Examiner—Benedict V. Safourek
Attorney, Agent, or Firm—Rogers & Killeen

[57] ABSTRACT

A communication signalling system containing a control unit receiving input data from one source and a reference signal from another source, a modulator receiving an input from the control unit, and a plurality of tones from a separate source, the phase of each of the tones received by the modulator being modulated in response to the input received from the control unit, an adder which receives the modulated signals from the modulator and converts the signals into a composite signal which is then sent to a latch unit which also receives a signal from a symbol interval clock, the latch unit sending a composite signal to a transmitter for transmission during a given symbol interval, an antenna and receiver detector unit for receiving the signal being transmitted, the signal being forwarded to a filter and correspondence circuit which breaks out the individual modulated signals comprising the original frequency, the modulating phase, and a random unknown interference, the individual signals being applied to and demodulated by a demodulator unit, and then converted to an output data signal resembling the original input data signal.

17 Claims, 3 Drawing Sheets

IMPROVED SIGNALLING METHOD AND APPARATUS

This is a continuation of application Ser. No. 510,267, filed July 1, 1983, now abandoned.

BACKGROUND OF THE INVENTION

This invention relates to communications systems in general, and in particular to signaling methods and apparatus in systems for transmitting a plurality of information signals over a single transmission link.

Modern communications systems require the transmission of ever increasing amounts of information at relatively high rates of reliability. Such communications, however, are often subject to interference from both natural and manmade phenomena. For example, noise, multipath effects, fading bandwidth, and electromagnetic interference decrease the probablity that a transmitted signal will be received correctly.

Typically, reliability and speed of communication are inversely related. The more information which is sent in any given time in a particular bandwidth reduces the reliability that the information will be received correctly. Consequently, there has come about an interplay of methods which sacrifice transmission speed for reliability, or vice versa.

Several techniques are known to be used to increase reliability, albeit at the cost of some transmission speed. In one known method, information to be transmitted is redundantly communicated, the same message being transmitted repeatedly a predetermined number of times. In another method, transmitted data are sent along with a mathematically derived correction code to identify and rectify, if needed, a limited number of possible errors in the transmitted information. It is also known to first transmit a known reference signal followed by an information signal. The receiver can evaluate the reference signal to "sound" the condition of the transmission media, it usually being assumed that the reference signal will experience the same types and amount of interference as the subsequent information signal.

As the need for high speed communications has grown, methods have been implemented which transmit more than one bit of information at a time on a signal transmission medium. For example, in a typical phase shift keyed (PSK) system, a carrier wave is modulated in phase (quadraphase). Similarly, systems are known in which a plurality of carrier waves are modulated simultaneously by a string of information bits, the plurality of modulated signals then being combined and transmitted as a single signal. In such systems, the receiver separates the composite signal by filtering or other means, demodulates each of the carrier waves, and retrieves the informational contents.

In such systems it is known to transmit reference signals along with the informational signals and to use the reference signals to decode the informational signals. For example U.S. Pat. No. 3,290,440 to Easton et al. discloses a data transmission system in which two information signals and two reference signals are transmitted simultaneously. The informational signals are decoded by comparing each to one of the references and by comparing the two references to themselves.

In the patent to Downey et al. (U.S. Pat. No. 3,404,229), a plurality of data signals each modulated on different carrier frequencies are combined with three reference signals and the composite signal is transmitted. The receiver utilizes the reference signals to determine the interference of the transmission medium and to subtract the effects of the interference from the data signals. In such systems, the reference signals are each transmitted at carrier frequencies, which are different from each of the frequencies of the data signals. Such systems assume that the interference, i.e., the noise, jitter and other errors are uniform for both reference and data signals. However, it is known that interference does not have the same effects on all frequencies in many instances.

It is therefore an object of the present invention to obviate many of the problems of known systems and to provide a novel communication system of improved transmission speed and reliability.

It is another object of the present invention to provide a novel communication system in which data signals are determined with reference to the interference effects measured at the same frequency as the data signal.

It is yet another object of the present invention to provide an improved signalling method for multiple carrier data transmission systems.

It is still a further object of the present invention to provide a novel communication system whereby transmitted data may be decoded with reference to channel interference occurring prior to, concurrent with, and/or subsequent to the data being decoded.

These and other objects and advantages of the present invention will become apparent to one skilled in the art from the claims and from a perusal of the following detailed description when read in conjunction with the attached drawings.

DETAILED DESCRIPTION

In its preferred embodiment, the present invention relates to a multi-tone phase-shift-keyed (PSK) communication system. It will be apparent, however, that the present invention is applicable to a wide variety of communication systems in which independent signals are transmitted as a composite signal, without regard to the type of modulation used.

Figure 1:
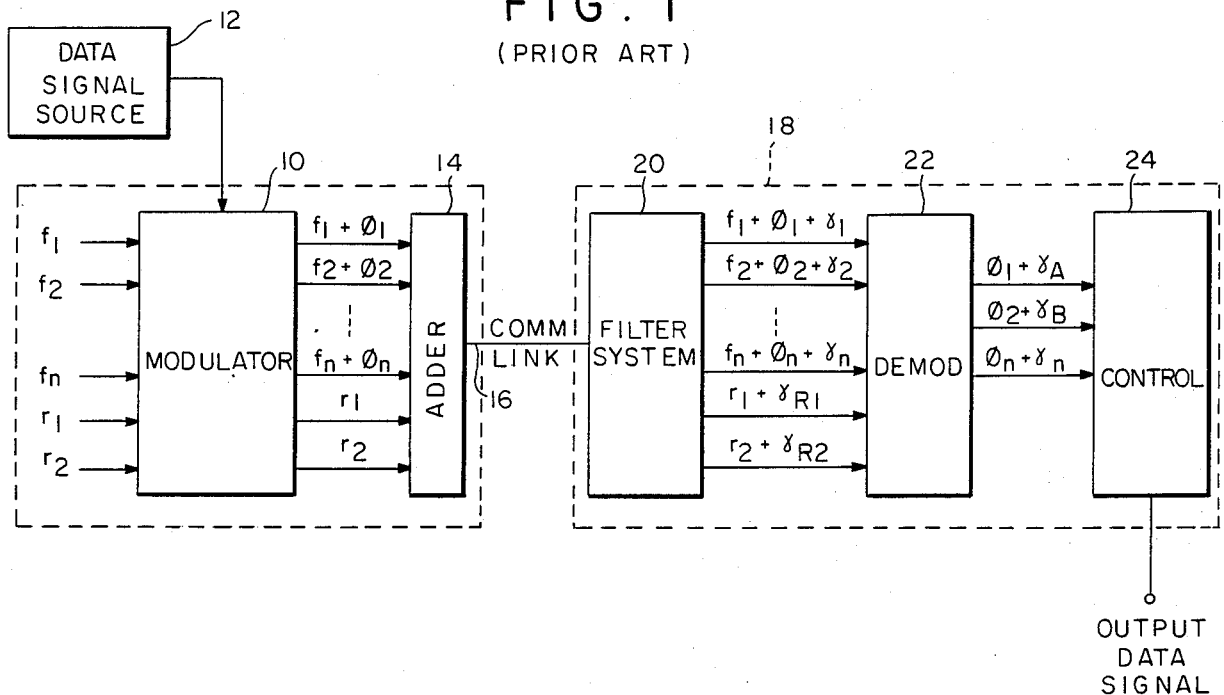
FIG. 1 is a functional block diagram of a prior art multiple carrier communication system using a conventional signalling method.

A conventional data transmission system is depicted in FIG. 1, in which a plurality of different carrier frequencies or tones, f1, f2, ... fn are phase modulated in a modulator 10 in response to an incoming data signal from a data signal source 12. As a result of the modulation, the phase of each of the carrier frequencies $f_1, f_2, \ldots f_n$ is altered to reflect a portion of the incoming data signal. Thus, there appears at the output terminals of the modulator 10 a plurality of modulated signals $f_1+o_1$, $f_2+o_2, \ldots f_n+o_n$, where $0_i$ represents the phase shift associated with a portion of the incoming data signal.

Additionally, a conventional transmission system may include one or more reference signals, $r_1$, $r_2$. The reference signals are system standard signals having a predetermined frequency and phase.

The plurality of modulated signals may be combined and transmitted through conventional sampling techniques. For example, the modulated signals and the reference signals may be linearly added by an adder 14 which samples each of the frequencies to determine its phase during a predetermined sampling interval and adds the phases together to provide a composite phase.

The composite phase may be transmitted along a conventional communications link 16 for receipt by a receiver 18.

While the composite signal is communicated, the signal is subjected to numerous sources of interference such as noise, multipath effects, band width fading, etc. Upon receipt, the composite modulated signal may be filtered by a filter system 20 to provide the individual modulated signals. As a result of the interference, the individual modulated signals recovered by the filter system 20 are not the same as the modulated signals produced by the modulator 10 but may include interference elements 1, 2 ... n, r1, r2 added to each of the signals. Some of the interference sources may affect equally each of the modulated signals; but, other interference sources may have greater effect on certain frequencies than on other frequencies or may have an effect which is delayed in time on certain frequencies.

To recover the phase relationships within the modulated signal and hence to recover the input data signal, a demodulator 22 may be used to heterodyne the individual modulated signals. During the demodulation process, the reference signals provide a measure of the interference which is common to all the frequencies and this measure may be used to reduce the total interference on each of the individual modulated signals. A control circuit 24 may then recover the input data signal (to within the accuracy of the individual demodulated signal).

Figure 2:
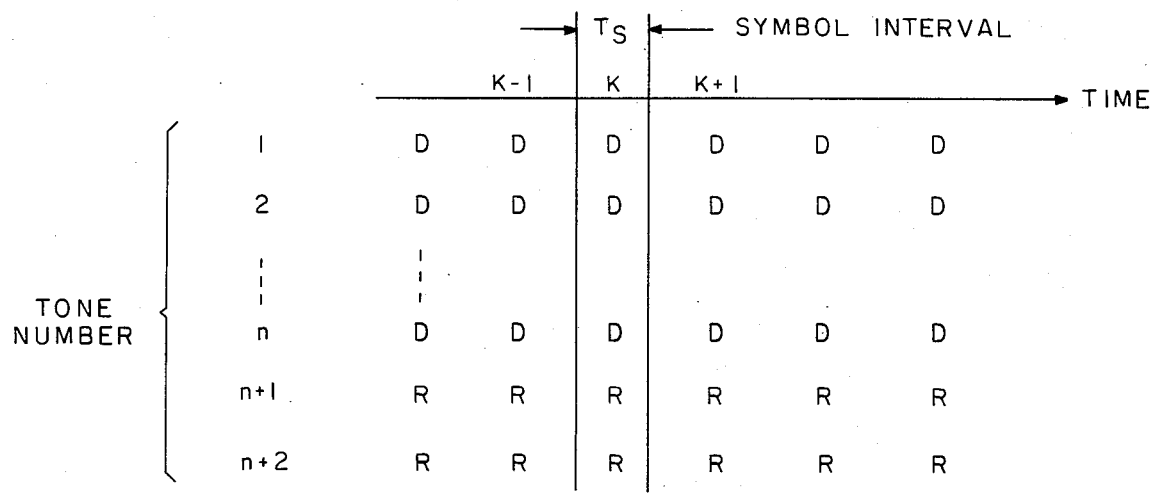
FIG. 2 is a time-frequency map illustrating the signalling method utilized in the prior art communication system of FIG. 1.

With reference to FIG. 2, the signal transmitted by the communication system of FIG. 1 may be illustrated by a time-frequency map. The horizontal dimension of the map in FIG. 2 represents time, which can be divided into individual symbol intervals of time, $T_s$. The vertical dimension represents frequency which is divided into an interval for each of the carrier and reference frequencies. In operation, the system of FIG. 1 may demodulate the data in the $k^{th}$ symbol interval for the second tone with reference to the reference frequencies (tone numbers n+1 and n+2) during the same symbol interval and to the data demodulated in the (k−1) symbol interval for the second tone.

The use in decoding of reference frequencies which may be quite distant from a particular carrier frequency may not accurately reflect the interference which has occurred on that carrier frequency. Further, the use of the data demodulated in the (k−1) symbol interval to decode data in the $k^{th}$ interval is known to cause duplication of errors. For example, if the data demodulated in the (k−1) interval is erroneous, data which is demodulated in the $k^{th}$ interval based on that erroneous data may also be erroneous.

Figure 3:
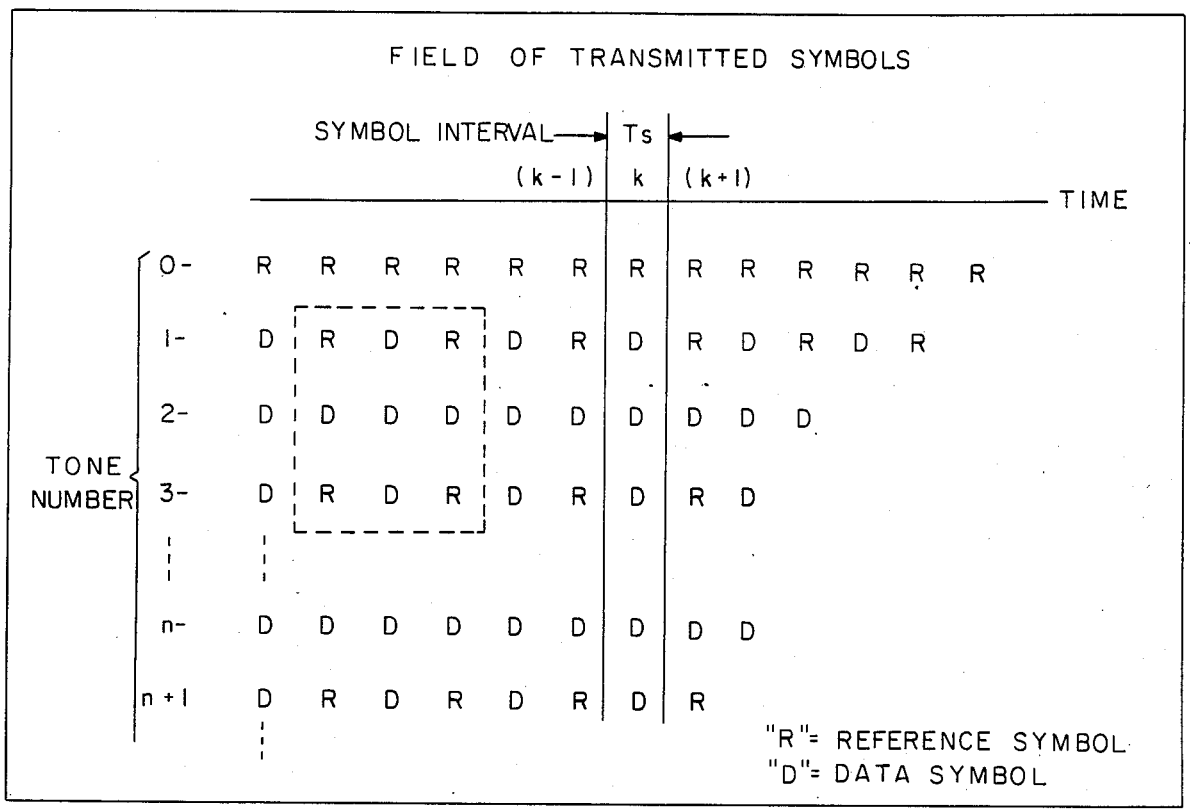
FIG. 3 is a time-frequency map illustrating the signalling method utilized in communication system using an embodiment of the signalling method of the present invention.

A solution to the interference problems known in current communications systems is illustrated in the time-frequency map of FIG. 3. In accordance with the present invention, reference signals of known frequency and phase are provided at regular intervals on all carrier frequencies. The use of these reference signals which occur at a prior, simultaneous, or subsequent time on adjacent tones and, prior and subsequently on the same tones provides an improved "sounding" of the transmission channel actually traversed by the transmitted signal.

Figure 4:
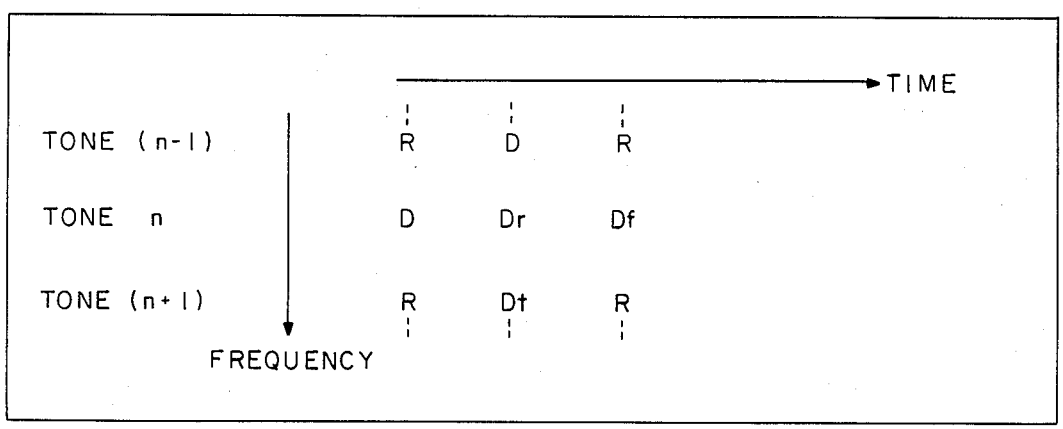
FIG. 4 is a portion of the time-frequency map of FIG. 3 illustrating a method of decoding data signals in accordance with the present invention.

With reference to FIG. 4 wherein is illustrated the outlined portion of the time-frequency map of FIG. 3, in the scheme of the preferred embodiment, each data signal can be considered one of three types, $D_r$, $D_t$ and $D_f$. The data signal $D_t$ may be demodulated by comparing it in phase to a reference signal formed by an interpolation in time between the immediately preceding and immediately succeeding reference signals. The data signal $D_f$ may be demodulated by comparing it in phase to a reference signal formed by an interpolation in frequency over the reference signals on nearby carrier frequencies during the same symbol interval. The data signal $D_r$ may be demodulated by comparing it in phase to a reference signal formed by a joint interpolation in time and frequency over nearby reference symbols preceding and succeeding in time and nearby in frequency.

With reference to both FIGS. 3 and 4, it will be observed that all the data signals appearing in the time-frequency map of FIG. 3 has a relationship to the nearby reference signal that may be characterized as a $D_t$, $D_f$ or a $D_r$ type data signal. Thus, all the data signals may be decoded using only three different reference schemes.

It will be observed that many different types of demodulation schemes may be implemented utilizing the reference signals proximate in time and/or frequency to the data signal being demodulated. The demodulation schemes described above in relation to $D_r$, $D_t$ and $D_f$ of FIG. 4 are meant to be illustrative only and not by way of limitation. For example, there is no requirement that any of the tones illustrated in FIG. 3 be composed exclusively of reference signals, such as shown in tone number 0 of FIG. 3. The method of using the reference signals in the present invention effectively forms an estimate of the total communications channel experienced by each data signal. The demodulation process using these reference signals is nearly equivalent to passing the data signal through a "matched filter" for the transmission path during phase demodulation and therefore removing the random unknown perturbations caused by the channel.

Figure 5:
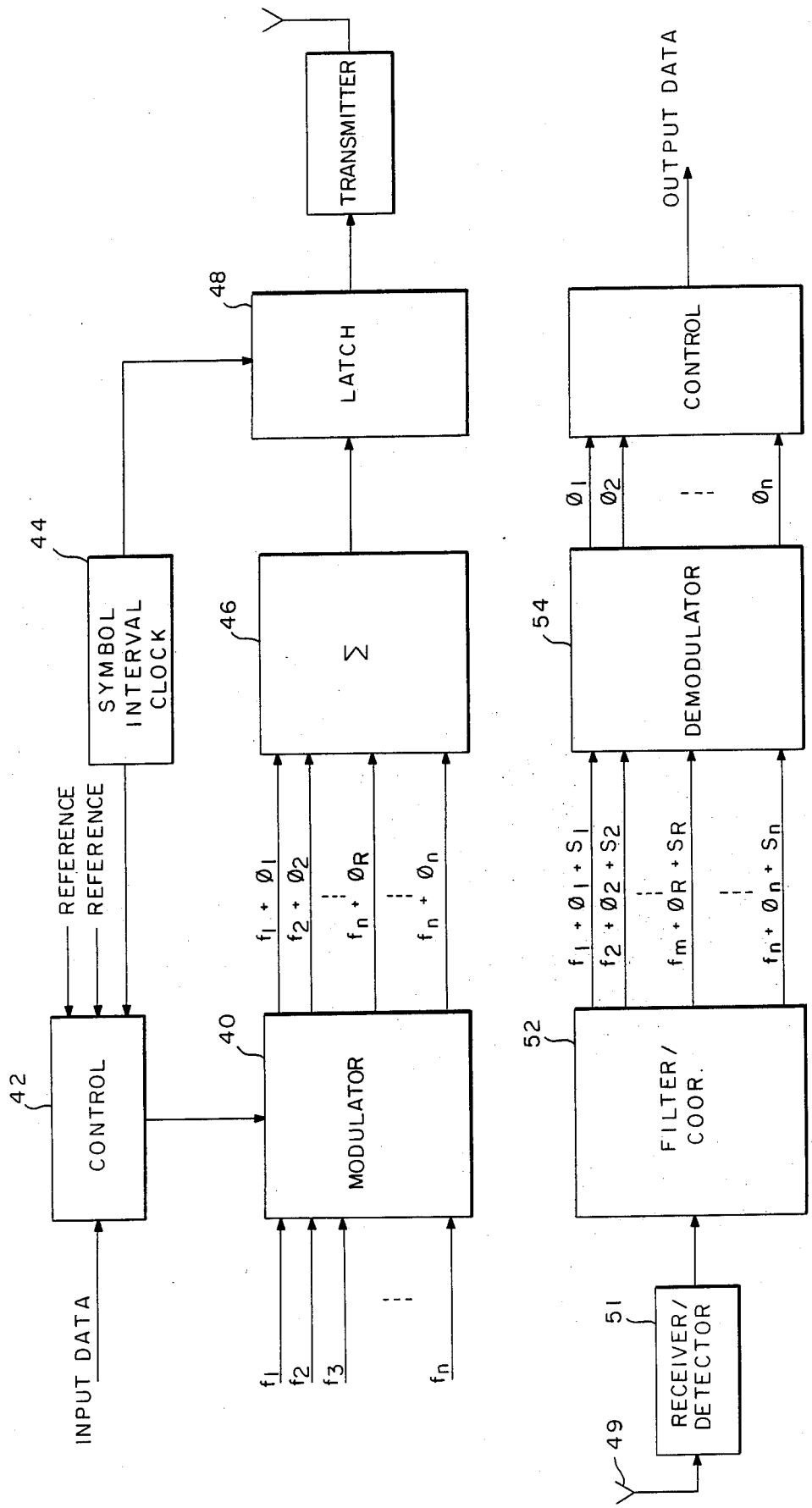
FIG. 5 is a functional block diagram of a communication system using an embodiment of the signalling method of the present invention.

FIG. 5 depicts a simplified functional block diagram of a multi-tone digital modem utilizing the signalling method of the present invention. A plurality of carrier frequencies or tones $f_1$, $f_2$, ... $f_n$ are each modulated by a modulator 40 in response to a control means 42. The control means 42 selectively presents either a predetermined number of bits from the input data from one or more information signals or a reference signal to the modulator 40 for modulating each of the tones during each symbol interval, controlled by a symbol interval clock 44. The reference signal may be plural, differing reference signals so long as the control means 42 interweave the reference signal(s) with input data in a predetermined sequence. Of course, it is well understood by those skilled in the art that the rate of the data being provided by the control means 42 may be less than the data rate of the input data as the control means 42 interweaves the input data and the reference signal.

In the modem of FIG. 5, the modulator 10 modulates the phase of each of the tones in response to the signal received from the control means 42. Thus, during each symbol interval some of the tones are modulated by a phase indicative of the reference signal and the remainder of the tones are modulated by phases indicative of the input data signal.

With continued reference to FIG. 5, during each symbol interval, the total phase of each of the modulated tones is summed by adder 46 to obtain a composite signal which is placed into a latch 48 for transmission during the next symbol interval.

The transmitted composite signal is received by a conventional antenna 49 and receiver/detector 51 and is split back into the individual modulated signals by a filter and correspondence circuit 52. The individual modulated signals comprise the original frequency, $f_n$, the modulating phase, $0_n$, and a random, unknown interference, $S_n$. The modulated signals are demodulated by demodulator 54 using the known reference signals to determine the interference in each of the transmitted modulated signals, as described above in relation to FIGS. 3 and 4. The output signals from the demodulator are phase signals representative of and readily convertible to an output data signal resembling the input data signal.

The present invention may be embodied in other specific forms without departing from the spirit of the essential characteristics thereof. The presently disclosed embodiment is therefore considered in all respects to be illustrative and not restrictive. The scope of the present invention is indicated by the appended claims rather than the foregoing description, and all modifications which come within the scope of the claims when accorded a broad range of equivalency are therefore intended to be embraced therein.

What is claimed is:

1. A communication system comprising:
   means for producing a first information signal;
   a reference signal;
   modulating means for producing a plurality of modulated signals in response to a plurality of input signals being transmitted thereto;
   control means receiving said first information signal and said reference signal to apply said first information signal to said modulating means and periodically to apply said reference signal to said modulating means instead of said first information signal;
   combining means operative to generate a composite signal responsive to said plurality of modulated signals;
   transmitting means to transmit said composite signal;
   receiving means to receive said transmitted composite signal;
   separating means responsive to said received composite signal to provide said plurality of modulated signals; and
   demodulating means responsive to said plurality of separated modulated signals to produce a plurality of reference signals and a second information signal representative of said first information signal, each element of said second information signal being produced with reference to elements of said reference signal received prior to and simultaneously with said second information signal.

2. The communication system of claim 1 wherein some of said second information signal is produced with additional reference to elements of said reference signal received subsequent to said second information signal.

3. The communication system as defined in claim 1 wherein each of said first and second information signals comprises a plurality of information signals.

4. A communication system, comprising:
   means providing a plurality of parallel carrier frequencies;
   a reference signal;
   control means for providing to each of said carrier frequencies a first information signal, said control means selectively and in a predetermined manner substituting said reference signal into said first information signal in place of said first information signal without loss of any portion of said first information signal;
   modulating means receiving each of said parallel carrier frequencies for producing plural parallel modulated signals carried on each of said carrier frequencies in response to said first information signal and said reference signal;
   combining means for generating a composite signal responsive to said plural parallel modulated signals;
   transmitting means to transmit said composite signal;
   receiving means to receive said transmitted composite signal;
   separating means responsive to said received composite signal to provide plural parallel modulated received signals;
   demodulating means responsive to said plural parallel modulated received signals to provide plural parallel received reference signals and a second information signal representative of said first information signal, each element of said second information signal being produced with reference to elements of said received reference signals received both prior to and simultaneously with each of said second information signal.

5. The communication system of claim 4 further comprising means for producing said second information signal with reference to elements of said received reference signal received subsequent to said second information signal.

6. The communication system as defined in claim 4 wherein each of said first and second information signals comprises a plurality of information signals.

7. A communication system comprising:
   a serial stream of digital data;
   a reference signal;
   plural parallel carrier signals;
   control means to selectively substitute said reference signal into said stream of digital data in place of and without loss of said stream of digital data;
   modulating means for modulating one of said plural carrier signals with said stream of digital data and said reference signal;
   combining means for combining all of said modulated carrier signals into a composite signal to be transmitted;
   separating means for separating said composite signal into plural modulated carrier signals; and
   demodulating means for demodulating each of said plural modulated carrier signals to provide an information signal, said information signal being demodulated with reference to reference signals received on said plural modulated carrier signals.

8. The communication system of claim 7 further comprising means for demodulating said modulated carrier signals with reference to reference signals received at the same time as and prior to the receipt of said information signal.

9. The communication system of claim 8 further comprising means for demodulating said modulated carrier signals with reference to reference signals received subsequent to the receipt of said information signals.

10. The communication system of claim 7 further comprising means for demodulating each of said modulated carrier signals with reference to reference signals received on another of said modulated carrier signals.

11. The communication system of claim 7 further comprising means for demodulating one of said modulated carrier signals with reference to reference signals received on said one of said modulated carrier signals prior to receipt of said information signal.

12. The communication system as defined in claim 7 wherein said stream of digital data comprises data from plural sources and wherein said information signal comprises data representative of said data from plural sources.

13. A communication system comprising: signal generating means to provide a first information signal;
a reference signal;
combining means operative to generate a composite serial signal responsive to said first information signal and to said reference signal;
transmitting means to transmit said composite signal;
receiving means to receive said transmitted composite signal;
separate means responsive to said received composite signal to provide a second information signal;
decoding means responsive to said second information signal and operative to provide an output signal representative of said first information signal, said second information signal being determined at least in part with reference to elements of said reference signal periodically transmitted in lieu of said first information signal.

14. The communication system as defined in claim 13 wherein each of said first and second information signals comprises a plurality of information signals.

15. A communication system comprising:
an input signal representing information to be transmitted;
a predetermined reference signal;
modulating means;
control means receiving said input signal and said reference signal to selectively apply either said input signal or said reference signal to said modulating means, said modulating means being operable to modulate a plurality of different tones in response to the signal selectively applied by said control means to produce a plurality of modulated tones; and
demodulating means to demodulate said plurality of modulated tones and to recover said input signal, wherein each element of said input signal is recovered with reference to elements of said predetermined reference signal transmitted on the same tone.

16. A receive system comprising:
detecting means to detect a composite signal generated by the periodic application of a reference signal and a first information signal to a modulator;
separating means responsive to said detected composite signal to provide a plurality of modulated signals; and
demodulating means responsive to said plurality of separated modulated signals to produce a plurality of reference signals and a second information signal representative of said first information signal being produced with reference to elements of said reference signal received both prior to and simultaneously with each said signal.

17. The communication system as defined in claim 16 wherein each of said first and second information signals comprises a plurality of information signals.

* * * * *